(12) United States Patent
Stieger et al.

(10) Patent No.: US 10,938,279 B2
(45) Date of Patent: Mar. 2, 2021

(54) ELECTRICAL MACHINE

(71) Applicant: ROLLS-ROYCE plc, London (GB)

(72) Inventors: Rory D. Stieger, Derby (GB); Roy S. Bartle, Isle of Lewis (GB)

(73) Assignee: ROLLS-ROYCE PLC, London (GB)

( * ) Notice: Subject to any disclaimer, the term of this patent is extended or adjusted under 35 U.S.C. 154(b) by 106 days.

(21) Appl. No.: 16/222,198

(22) Filed: Dec. 17, 2018

(65) Prior Publication Data

US 2019/0214887 A1 Jul. 11, 2019

(30) Foreign Application Priority Data

Jan. 5, 2018 (GB) ..................................... 1800167

(51) Int. Cl.
*H02K 9/20* (2006.01)
*H02K 3/24* (2006.01)
*H02K 9/22* (2006.01)
*H02K 3/14* (2006.01)
*H02K 9/197* (2006.01)
(Continued)

(52) U.S. Cl.
CPC ............... *H02K 9/20* (2013.01); *F01D 15/10* (2013.01); *F28D 15/02* (2013.01); *H02K 3/14* (2013.01); *H02K 3/24* (2013.01); *H02K 7/1823* (2013.01); *H02K 9/197* (2013.01); *H02K 9/22* (2013.01); *F05D 2220/323* (2013.01)

(58) Field of Classification Search
CPC .............................. H02K 9/19–20; H02K 9/22
USPC ..................................................... 310/52–65
See application file for complete search history.

(56) References Cited

U.S. PATENT DOCUMENTS

| 3,906,261 A | 9/1975 | Ogura et al. |
| 2004/0155539 A1* | 8/2004 | Potoradi ................. F28D 15/02 310/58 |

(Continued)

FOREIGN PATENT DOCUMENTS

| CN | 102097907 | 6/2011 |
| GB | 2154377 | 9/1985 |

(Continued)

OTHER PUBLICATIONS

Great Britain search report dated Jun. 25, 2018, issued in GB Patent Application No. 1800167.7.

(Continued)

*Primary Examiner* — Quyen P Leung
*Assistant Examiner* — Minki Chang
(74) *Attorney, Agent, or Firm* — Brinks Gilson & Lione

(57) ABSTRACT

An electrical machine has a stator carrying electrical windings which protrude at opposite ends of the stator to form respective, ring-shaped end windings. The electrical machine further has a rotor having a plurality of magnetic field-producing elements for producing a rotor magnetic field which interacts with a stator magnetic field produced by the windings. The electrical machine further has a coolant bath for holding liquid coolant. The electrical machine further has a heat sink in thermal contact with at least one of the end windings, the bath and the heat sink being configured such that the heat sink is immersed in the coolant held in the bath. The heat sink defines one or more fluid pathways configured such that vapour bubbles, formed when coolant in contact with the heat sink boils, escape by rising through the heat sink.

9 Claims, 4 Drawing Sheets

(51) Int. Cl.
*F01D 15/10* (2006.01)
*F28D 15/02* (2006.01)
*H02K 7/18* (2006.01)

(56) References Cited

U.S. PATENT DOCUMENTS

| | | | |
|---|---|---|---|
| 2010/0026109 A1* | 2/2010 | Hassett | F28D 15/0275 310/54 |
| 2010/0201129 A1* | 8/2010 | Holstein | H02K 9/22 290/53 |
| 2013/0027883 A1 | 1/2013 | Campbell et al. | |
| 2014/0035404 A1 | 2/2014 | Hamer et al. | |

FOREIGN PATENT DOCUMENTS

| | | |
|---|---|---|
| GB | 2233836 | 1/1991 |
| JP | S593542 | 1/1984 |

OTHER PUBLICATIONS

European search report dated May 17, 2019, issued in EP Patent Application No. 18210450.

* cited by examiner

ELECTRICAL MACHINE

CROSS-REFERENCE TO RELATED APPLICATIONS

This application claims the benefit of priority from British Patent Application No. GB 1800167.7, filed on 5 Jan. 2018, the entire contents of which are incorporated herein by reference.

BACKGROUND

Technical Field

The present disclosure relates to an electrical machine and cooling thereof.

Description of the Related Art

Electrical machines produce heat from resistive losses in the stator windings. In power dense machines, active cooling of the stator can be required to avoid material failure from excessive temperatures.

The main body of the stator can be cooled using, for example, a cooling jacket. However, such jackets are generally not effective for cooling the end windings where the stator windings protrude from the ends of the stator. In these regions, it has been proposed to use blown air, or jet impingement of air or liquid. Another option is to adopt convective cooling of the end windings by immersing them in a liquid.

It would be desirable to improve the cooling of stator end windings.

SUMMARY

Accordingly, in a first aspect the present disclosure provides an electrical machine having:

a stator carrying electrical windings which protrude at opposite ends of the stator to form respective, ring-shaped end windings;

a rotor having a plurality of magnetic field-producing elements for producing a rotor magnetic field which interacts with a stator magnetic field produced by the windings;

a coolant bath for holding liquid coolant; and a heat sink in thermal contact with at least one of the end windings, the bath and the heat sink being configured such that the heat sink is immersed in the coolant held in the bath;

wherein the heat sink defines one or more fluid pathways configured such that vapour bubbles, formed when coolant in contact with the heat sink boils, escape by rising through the heat sink.

The heat sink can increase the surface area available for heat transfer, improving thermal management of the end winding by the coolant bath, while helping to avoid any bubbles formed by boiling coolant developing into a trapped vapour layer (which would reduce heat transfer).

The heat sink may advantageously be retrofitted to an existing machine to improve its thermal performance.

In a second aspect, the present invention provides a gas turbine engine having an auxiliary drive driven by the engine and an electrical power generator in turn driven by the auxiliary drive, the electrical power generator being an electrical machine according to the first aspect.

Optional features of the present disclosure will now be set out. These are applicable singly or in any combination with any aspect of the present disclosure.

The liquid coolant is typically non-electrically conductive. For example, it can be a fluorinated hydrocarbon such as Novec 7000™.

The magnetic field-producing elements can be permanent magnets or further windings.

The heat sink may comprise a circumferential row of spaced elongate members which extend from the end winding into the coolant bath, spaces between the elongate members providing the fluid pathways. For example, the elongate members can be shaped as cylinders, frustocones or cones. Another option is for the heat sink to comprise a ring-shaped foraminous, e.g. reticulated, structure which extends from the end winding into the coolant bath, holes in the foraminous structure providing the fluid pathways. Yet another option is for the heat sink to comprise a row of vertically-extending, spaced bars which extend across a face of the end winding, the spaces between the bars providing the fluid pathways.

The machine may further have an intermediary heat conductor between the end winding and the heat sink. The intermediary heat conductor can help to avoid undesirable electromagnetic effects caused by the proximity of the heat sink to the end winding. For example, the intermediary heat conductor may be a ring of electrically insulating material such as e.g. MgO, which can be in the form of compacted powder. Advantageously, MgO is an electrical insulator which also has high thermal conductively. Additionally or alternatively the heat sink may be formed of a dissimilar material to the windings.

The end winding may have a flat end surface for enhanced thermal contact with the heat sink. To facilitate this, the windings may be formed of, for example, Litz wire, rectangular wire or conductor bars.

However, as an alternative, the heat sink may be formed integrally with the end winding. The thermal contact between the heat sink and the end winding can then be considerably enhanced. For example, if the windings are formed of Litz wire, then the heat sink can be an end portion of the end winding in which passages are formed in the Litz wire to provide the fluid pathways for escape of the vapour bubbles. As another example, if the windings are formed of conductor bars, then the heat sink can be integral projections from the end winding with passages formed therebetween to provide the fluid pathways.

Typically, the machine has a respective heat sink in thermal contact with each of the end windings, the bath and both heat sinks being configured such that the heat sinks are immersed in the coolant.

The end winding(s) may also be immersed in the coolant. Indeed, the entire stator windings may be immersed.

Conveniently, the machine may further have a frame or casing for holding the heat sink(s) in thermal contact with the end winding(s).

The machine may further have a condenser (e.g. a condenser coil or other type of condenser known to the skilled person) operatively connected to the coolant bath for condensing the vapour formed from the coolant and returning the condensed coolant back to the coolant bath. Conveniently, the condenser function may be formed in a housing of the electrical machine or it may be a unit outside such a housing. The condensed coolant may be gravity fed back to the bath, or its return may be assisted e.g. by a wicking system or a pump.

DESCRIPTION OF THE DRAWINGS

Embodiments of the present disclosure will now be described by way of example with reference to the accompanying drawings in which.

DETAILED DESCRIPTION

Figure 1:
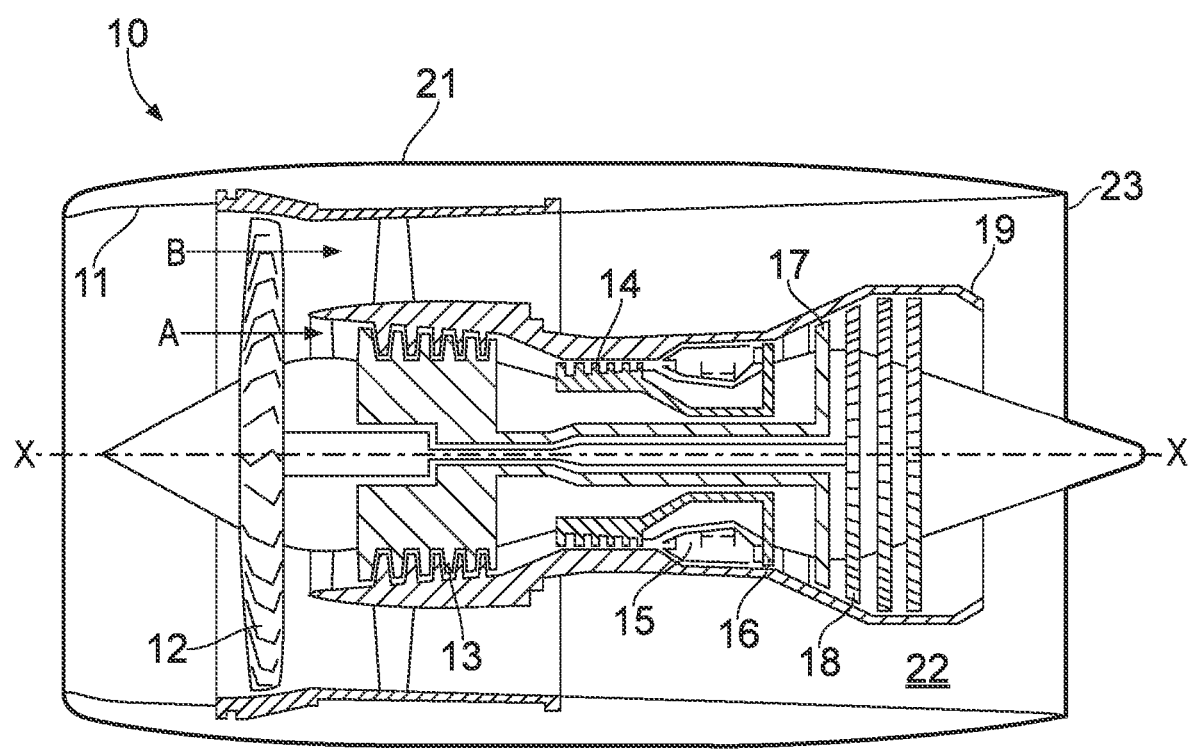
FIG. 1 shows a longitudinal cross-section through a ducted fan gas turbine engine.

With reference to FIG. 1, a ducted fan gas turbine engine is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

The gas turbine engine has one or more associated electrical machines. For example, an accessory drive powered by an offtake from one of the interconnecting shafts may in turn power an electrical generator for providing power to aircraft electrical systems. Such a generator can also act in reverse operation as a starter motor.

The electrical machine has a (typically hollow cylindrical) stator and associated electrical windings which are typically held in slots defined between inwardly-directed poles of the stator, and a rotor located coaxially within the stator and having a plurality of magnetic field-producing elements, such as permanent magnets or further windings. These elements produce a rotor magnetic field which interacts with a stator magnetic field produced by the windings, whereby the machine operates as an electrical power generator or electrical motor, depending on the application.

The stator windings protrude at opposite ends of the stator to form respective, ring-shaped end windings. In a high power density machine, the windings may be formed from e.g. Litz wire, rectangular wire or conductor bars to improve the fill factor of the windings in the slots. Such a practice also facilitates the production of end windings with flat external surfaces.

The electrical machine further has a liquid coolant bath for holding electrically insulating liquid coolant, such as fluorinated hydrocarbon, an example being Novec 7000™ from 3M. The bath is used to cool the end windings (as discussed in more detail below), but it can also be used to cool the entire stator by total immersion of the stator in the coolant. In this case, seals at either end of the rotor can prevent the coolant entering the space inside the stator occupied by the rotor so that the rotor can rotate in air rather than substantially more viscous liquid.

At least one, but preferably both, of the end windings has a respective heat sink in thermal contact the end winding. Heat produced by resistive losses in an end winding thus flows into its heat sink, which is immersed in the coolant of the bath. In this way, the heat produced in the end winding can be efficiently removed, improving the performance of the machine.

Figure 2:
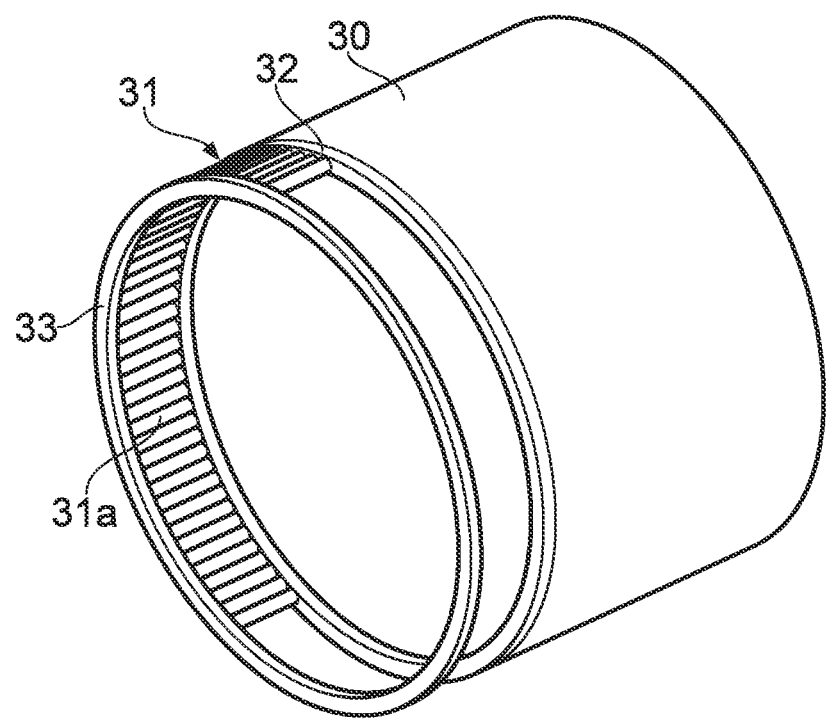
FIG. 2 shows schematically stator windings of an electrical machine, and a heat sink for an end winding.

FIG. 2 shows schematically the stator windings 30, and the heat sink 31 extending from an end winding thereof. As mentioned above, another heat sink can extend from the opposite end winding, but this is not shown in FIG. 2. A ring-shaped intermediary heat conductor 32 is provided between the end winding and its heat sink to electrically insulate the heat sink from the windings. In this way, electromagnetic interference between the heat sink and the windings can be better avoided. For example the intermediary heat conductor can be formed of as a gasket of material such as MgO, e.g. in compacted power form, which is an electrical insulator but a good conductor of heat. A frame or casing 33 (only a part of which is shown in FIG. 2) can be provided to hold the heat sink and intermediary heat conductor against the end winding. Providing the end winding with a flat external surface can help to promote intimate contact, and hence enhanced heat transfer, between the end winding and the intermediary heat conductor.

As shown in FIG. 2, the heat sink 31 can be formed as a circumferential row of elongate members 31a (e.g. cylinders, frustocones or cones) which extend from the end winding into the coolant bath. These members have spaces therebetween so that vapour bubbles formed when the coolant boils on contact with the heat sink can escape by rising through the spaces whatever the orientation of the machine. Effectively, the spaces provide fluid pathways for the bubbles. Without such a pathway, trapped bubbles would form a vapour layer, reducing heat transfer from the heat sink into the coolant, and ultimately causing undesirable temperature fluctuations in the end winding.

Figure 3:
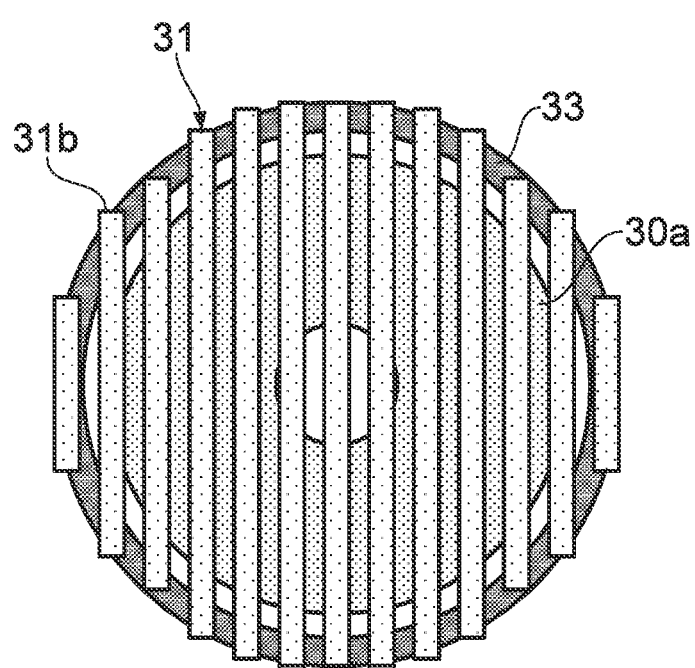
FIG. 3 shows schematically an end view of a variant of the machine.

Other configurations for the heat sink are possible. For example, instead of a row of elongate members, the heat sink may be formed as a foraminous or reticulated ring, in which holes in the ring provide the fluid pathways for escape of the bubbles. Another option is shown schematically in FIG. 3, which is an end view of a variant of the machine in which the entire end of the machine is covered by a heat sink 31 in the form of a row of substantially vertically-extending, spaced bars 31b which extend from top to bottom across the end winding 30a and ultimately join at their ends to the frame or casing 33. The spaces between the bars provide the fluid pathways for escape of the bubbles.

Figure 4:
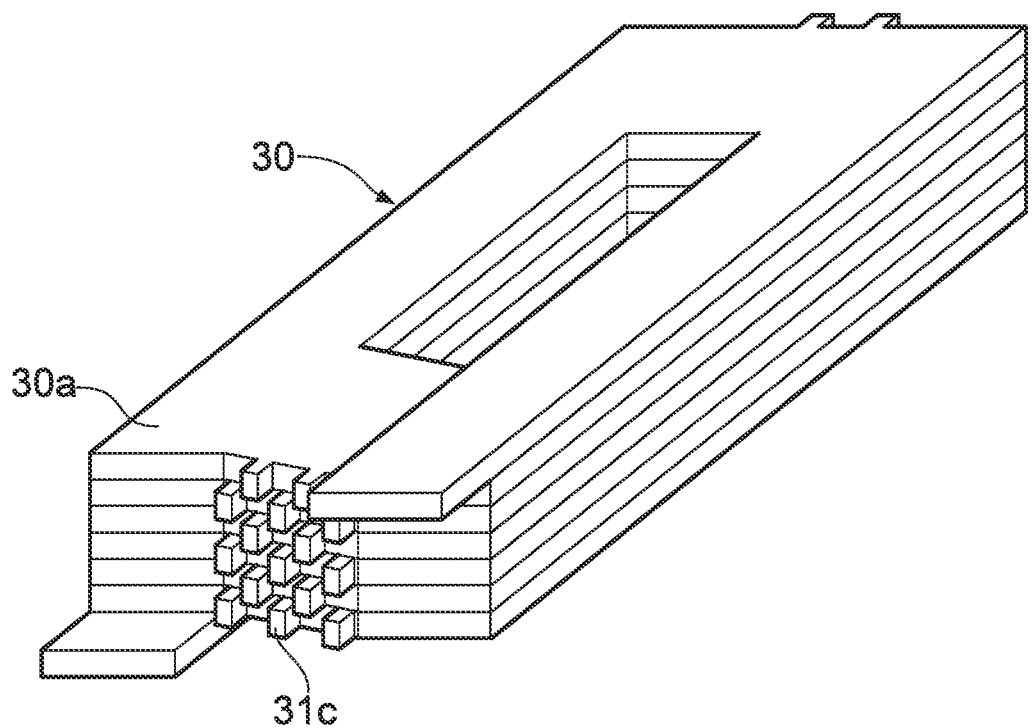
FIG. 4 shows schematically part of the stator windings of another variant of the machine, the windings having an integral heat sink for an end winding.
Figure 5:
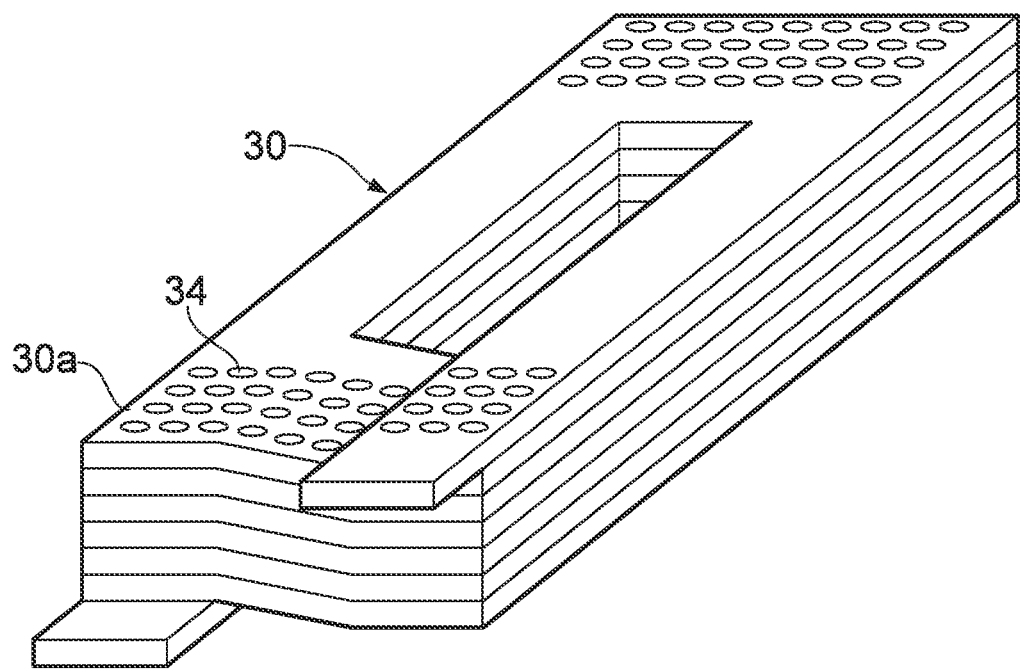
FIG. 5 shows schematically part of the stator windings of another variant of the machine, the windings having an integral heat sink for an end winding.

FIGS. 4 and 5 show schematically respective parts of the stator windings of further variants of the machine. In each of these variants the windings having an integral heat sink for an end winding. More particularly, in FIG. 4 the stator windings 30 are formed from conductor bars. At the end winding 30a, the bars have a heat sink comprising integral projections 31c from the end winding. These projections can be staggered to enhance heat transfer, while creating pathways therebetween for the upwards escape of vapour bubbles through the heat sink. In FIG. 5, by contrast, the stator windings 30 are formed from Litz wire. In this case, the integral heat sink is an end portion of the end winding 30a and the fluid pathways for escape of vapour bubbles are passages 34 formed in the Litz wire. The orientation of the passageways can be varied around the machine relative to the direction of wire so that the passageways remain approximately vertical.

By integrating the heat sink with the end winding in this way, thermal coupling between the heat sink and the end winding can be enhanced.

Figure 6:
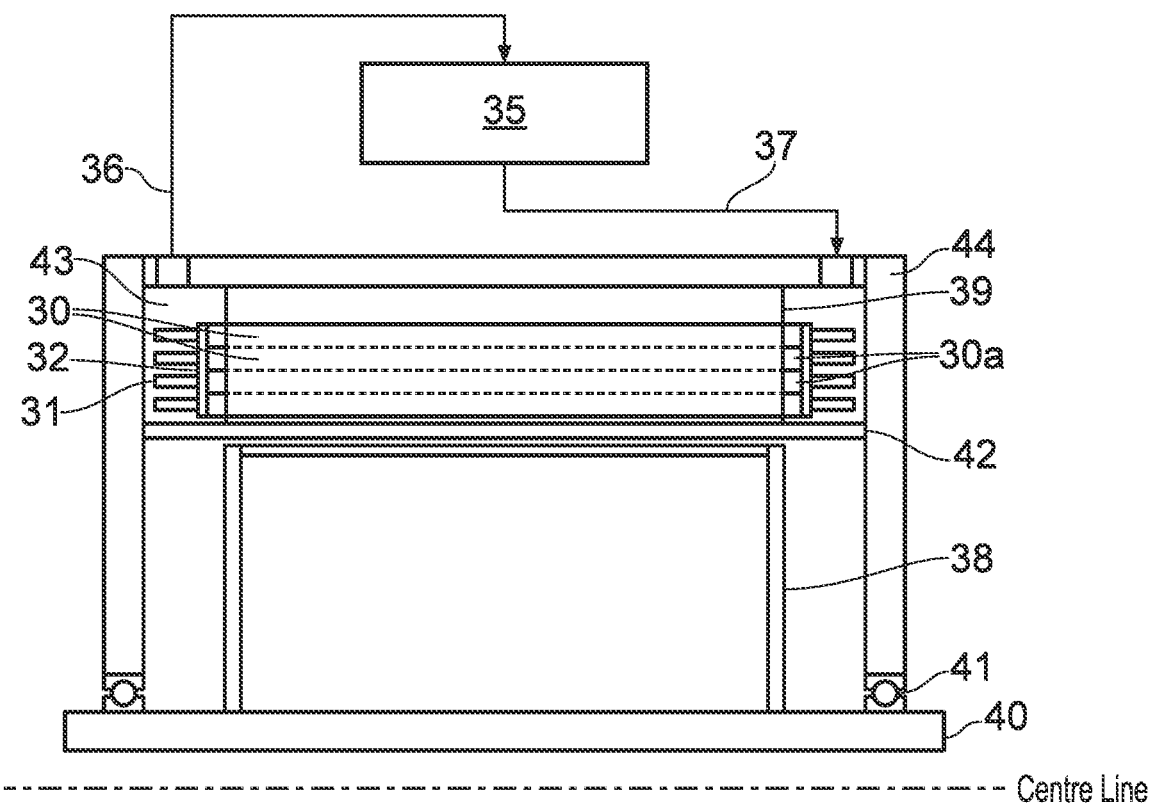
FIG. 6 shows schematically a longitudinal cross-section through an electrical machine having the stator windings of FIG. 2 and a condenser for condensing coolant vapour.

The electrical machine typically has a condenser (e.g. a condenser coil) for condensing the coolant vapour. For example, FIG. 6 shows schematically a longitudinal cross-section through an electrical machine having the stator windings 30 of FIG. 2 and a condenser 35 for condensing coolant vapour. Also shown are the machine's rotor 38, stator back iron 39, shaft 40, bearings 41, slot liner 42, coolant bath 43 and housing 44 for the rotor, stator and bath. The vapour from the coolant leaves the coolant bath through a port in an upper part of the housing and then travels to the condenser through a vapour conduit 36. The condensate returns to the bath from the condenser through a condensate conduit.

Although described above in relation to an aero gas turbine engine, the electrical machine of the present disclosure may be used in other industrial applications, such as marine and industrial power generation and drives.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Moreover, in determining extent of protection, due account shall be taken of any element which is equivalent to an element specified in the claims. Various changes to the described embodiments may be made without departing from the scope of the invention.

The invention claimed is:

1. An electrical machine having:
   a cylindrical stator carrying electrical windings which protrude in an axial direction at opposite ends of the stator to form respective, ring-shaped end windings;
   a rotor having a plurality of magnetic field-producing elements for producing a rotor magnetic field which interacts with a stator magnetic field produced by the electrical windings;
   a coolant bath for holding liquid coolant; and
   a heat sink in thermal contact with at least one of the end windings, the bath and the heat sink being configured such that the heat sink is immersed in the coolant held in the bath;
   wherein the heat sink defines one or more fluid pathways configured such that vapour bubbles, formed when the coolant in contact with the heat sink boils, escape by rising through the heat sink;
   wherein the heat sink comprises a circumferential row of spaced elongate members which extend in the axial direction, starting at one of the end windings that faces the heat sink, into the coolant bath, wherein spaces between the elongate members provide the fluid pathways, the heat sink and the cylindrical stator are discrete components, and one axial end of the heat sink faces the one of the end windings that faces the heat sink.

2. The machine according to claim 1, further having an intermediary heat conductor between the one of the end windings that faces the heat sink and the heat sink.

3. The machine according to claim 2, wherein the intermediary heat conductor is a ring of electrically insulating material.

4. The machine according to claim 1, wherein the one of the end windings that faces the heat sink has a flat end surface for thermal contact with the heat sink.

5. The machine according to claim 1 having a respective heat sink in thermal contact with each of the end windings, the bath and both heat sinks being configured such that the heat sinks are immersed in the coolant.

6. The machine according to claim 1 further having a frame or casing holding the heat sink in thermal contact with the one of the end windings that faces the heat sink.

7. The machine according to claim 1 further having a condenser operatively connected to the coolant bath for condensing the vapour formed from the coolant and returning condensed coolant back to the coolant bath.

8. The machine according to claim 1, wherein the electrical machine is an electrical power generator configured to be driven by a gas turbine engine.

9. An electrical machine having:
   a cylindrical stator carrying electrical windings which protrude in an axial direction at opposite ends of the stator to form respective, ring-shaped end windings;
   a rotor having a plurality of magnetic field-producing elements for producing a rotor magnetic field which interacts with a stator magnetic field produced by the electrical windings;
   a coolant bath for holding liquid coolant; and
   a heat sink in thermal contact with at least one of the end windings, the bath and the heat sink being configured such that the heat sink is immersed in the coolant held in the bath;
   wherein the heat sink defines one or more fluid pathways configured such that vapour bubbles, formed when the coolant in contact with the heat sink boils, escape by rising through the heat sink;
   wherein the heat sink comprises a plurality of rows of spaced-apart parallel bars which extend across a face of the at least one of the end windings and which lie in plane perpendicular to the axial direction of the cylindrical stator, the spaces between the bars providing the fluid pathways.

* * * * *